(12) United States Patent
Birch

(10) Patent No.: US 7,594,639 B2
(45) Date of Patent: Sep. 29, 2009

(54) CYLINDER VALVE

(75) Inventor: David William Birch, Whitehill (GB)

(73) Assignee: The BOC Group plc, Windlesham, Surrey (GB)

( * ) Notice: Subject to any disclaimer, the term of this patent is extended or adjusted under 35 U.S.C. 154(b) by 381 days.

(21) Appl. No.: 10/527,972

(22) PCT Filed: Sep. 15, 2003

(86) PCT No.: PCT/GB03/03963

§ 371 (c)(1),
(2), (4) Date: Jan. 13, 2006

(87) PCT Pub. No.: WO2004/027296

PCT Pub. Date: Apr. 1, 2004

(65) Prior Publication Data

US 2006/0138376 A1  Jun. 29, 2006

(30) Foreign Application Priority Data

Sep. 17, 2002  (GB) ................................. 0221554.9

(51) Int. Cl.
*F16K 31/44* (2006.01)
(52) U.S. Cl. ........................... 251/83; 251/82; 137/530
(58) Field of Classification Search ................. 137/524, 137/530, 327; 251/82, 83, 276
See application file for complete search history.

(56) References Cited

U.S. PATENT DOCUMENTS

| | | | | |
|---|---|---|---|---|
| 1,146,723 A | * | 7/1915 | Losh | 251/83 |
| 1,541,757 A | * | 6/1925 | Allen | 251/276 |
| 1,651,237 A | * | 11/1927 | Wilkins | 137/327 |
| 3,292,895 A | * | 12/1966 | Andre et. al. | 251/83 |
| 3,981,328 A | * | 9/1976 | Yonezawa | 137/614.2 |
| 4,364,541 A | * | 12/1982 | Chabat-Courrede et al. | 251/54 |
| 4,402,340 A | | 9/1983 | Lockwood, Jr. | |
| 4,911,403 A | * | 3/1990 | Lockwood, Jr. | 251/83 |
| 4,941,504 A | * | 7/1990 | Beauvir | 137/524 |
| 5,007,614 A | * | 4/1991 | Lockwood, Jr. | 251/83 |

FOREIGN PATENT DOCUMENTS

| | | |
|---|---|---|
| DE | 197 51 678 A1 | 6/1999 |
| DE | 199 41 276 A | 3/2001 |
| EP | 0 458 253 A | 11/1991 |
| GB | 1 319 764 A | 6/1973 |
| LU | 90254 A | 1/2000 |

* cited by examiner

Primary Examiner—John K Fristoe, Jr.
(74) Attorney, Agent, or Firm—Philip H. Von Neida

(57) ABSTRACT

A cylinder valve includes:
a single valve member in the form of a spring loaded shuttle, the spring exerting a pressure on the shuttle in a valve-closing direction;
a valve seat against which the valve member bears in its valve-closing position;
a guide defining a channel in which the shuttle is able to travel;
a stop member able to be translated in the channel into and out of a position in which the stop member holds the valve member in its valve-closing position; and
a valve body which is engaged by the guide, the guide being able to be translated into a position in which the shuttle cannot be brought to bear against the valve seat.

13 Claims, 1 Drawing Sheet

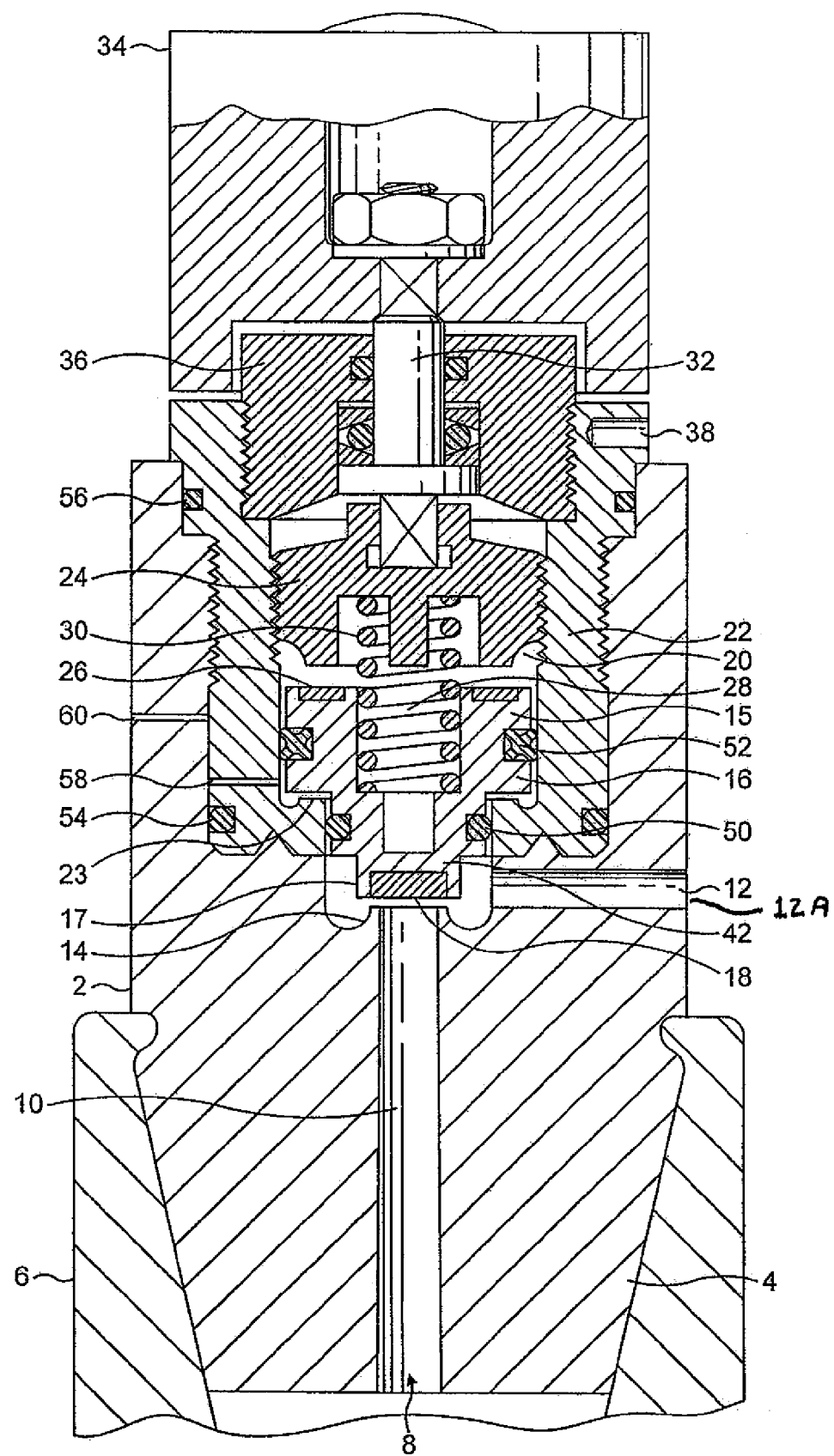

CYLINDER VALVE

BACKGROUND OF THE INVENTION

This invention relates to a cylinder valve, by which is meant a valve intended to control the flow of gas from a cylinder or other container in which the gas is stored under pressure, and a gas cylinder fitted with the cylinder valve.

Gas cylinders and other containers of compressed gas have been in common use for a long time for the storage of the compressed gas. A gas cylinder has a mouth which is fitted with a cylinder valve. The cylinder valve may be manually opened to release gas from the cylinder and closed again to stop the release of the gas. When the cylinder is empty it is refilled through the cylinder valve. The cylinder valve therefore needs to be of a configuration that permits such refilling to be carried out.

A traditional cylinder valve has a body including a valve seat; a valve member carried on a spindle, and a handwheel in which the spindle terminates. By turning the handwheel in the appropriate direction the valve may be opened and closed. When empty the cylinder may be filled with the valve in the open position.

A disadvantage of this traditional cylinder valve is that when the cylinder is empty or nearly empty backflow of impurities into the cylinder is possible. Such backflow of impurities is particularly undesirable when it is essential to maintain the purity of the gas, for example, when delivering a medical gas.

In order to overcome this disadvantage, some more modern forms of cylinder valve incorporate a second valve in addition to the spindle-operated valve, the second valve having a spring-loaded shuttle member, the spring acting against the pressure of the gas. When the pressure in the cylinder falls so low that it is no longer able to overcome the bias of the spring, the shuttle valve closes and the cylinder is no longer able to delivery gas. A positive pressure is therefore always maintained in the cylinder to prevent the backflow of impurities. The second valve is therefore sometimes referred to as a "residual pressure" or "minimum pressure" valve. Different configurations of the two valves in a single body are possible, but they all add to the complexity of the arrangement. An example of one possible configuration is given in GB patent specification 1 319 764.

It is an aim of the present invention to provide a simple cylinder valve which nonetheless retains the features of manual shut-off and maintenance of a residual pressure.

SUMMARY OF THE INVENTION

According to the present invention there is provided a cylinder valve including:

a single valve member in the form of a spring-loaded shuttle, the spring exerting a pressure on the shuttle in a valve closing direction;

a valve seat against which the valve member bears in its valve closing position;

a guide defining a channel in which the shuttle is able to travel;

a stop member able to be translated in the channel into and out of a position in which the stop member holds the valve member in its valve closing position; and a valve body which is engaged by the guide, the guide being able to be translated into a position in which the shuttle cannot be brought to bear against the valve seat.

The cylinder valve according to the invention is able to replicate the function of a shut-off valve by virtue of the translatable stop member and to replicate the function of a residual pressure valve by virtue of the action of the spring when the stop member is not in its valve closing position. Furthermore, refilling of the cylinder is permitted by translation of the guide into its position which prevents the shuttle being brought to bear against the valve seat.

Preferably, the cylinder valve is configured such that the cylinder is not able to be filled when the guide is not in its (re)filling position. Accordingly the shuttle preferably has a head extending in the direction of the valve seat from a body of greater diameter than the head, the head having an orifice affording gas communication between an external part of the valve and a region of the channel intermediate the shuttle and the stop member.

For convenience, the spring is preferably a compression spring, one end of which is seated in a recess in the shuttle, and the other end of which bears against the stop member. The orifice in the head of the shuttle preferably communicates with the said intermediate region of the channel via the recess.

Preferably, the valve seat is integral with the valve body. Alternatively, the valve seat can be mounted on the valve body.

Preferably, the stop member has a screw thread engaging a complementary screw thread on the guide. This arrangement facilitates the use of simple mechanisms for translating the stop member into and out of its valve closing position. For example, the stop member may be carried on or integral with a valve spindle, and the valve spindle may terminate in a handwheel.

Preferably, the guide has a screw threaded outer surface engaging a complementary screw thread in the valve body. This arrangement facilitates the use of simple devices for translating the guide when it is required to refill the cylinder. For example, the sleeve may have a socket in which can be inserted a tool operable to effect translation of the guide relative to the valve body.

In one example of a cylinder valve according to the invention the guide has an internal surface that acts as a stop preventing engagement of the shuttle and the valve seat when the guide is in the said position in which the shuttle cannot be brought to bear against the valve seat.

Any gas cylinder or other container of compressed gas may be fitted with a cylinder valve according to the invention. One example of such a cylinder is a gas cylinder containing a medical gas.

The body of the cylinder valve according to the invention may have a pin index for connection to an external pipeline. An advantage of this arrangement is that by employing different pin indices for different gases, it can be ensured that the correct gas can be delivered to the pipeline. Such precautions are particularly desirable when delivering medical gases.

BRIEF DESCRIPTION OF THE DRAWING

A cylinder valve according to the invention will now be described by way of example with reference to the accompanying drawing which is a schematic view, partly in section and partly in elevation, of the valve.

The drawing is not to scale.

DETAILED DESCRIPTION OF THE INVENTION

The valve shown in the drawing has a body 2. The lower end, as shown, of the body 2 has a screw-threaded, tapered, end 4 which communicates with the interior of a cylinder 6 when the end 4 is screwed into a tapped recess in the cylinder 6.

The body 2 of the cylinder valve has a main passageway 8 comprising a generally vertical inlet leg 10 which receives a flow of compressed gas from the cylinder 6 when the valve is open and a generally horizontal outlet leg 12 out of which the gas flows. In the region where the vertical leg 10 meets the horizontal leg 12 of the passageway 8, the body 2 has an annular projection 14 which acts as a valve seat. The valve seat 14 may be of a conventional configuration. When the valve is in the vertical position shown in the drawing the valve seat 14 is situated vertically below a shuttle 16. The shuttle 16 has a body 15 with an integral head 17 carrying an insert 18 of nylon or other soft plastics material, which, when the valve is in a closed position, engages the valve seat 14. The diameter of the body 15 is greater than that of the head 17. The shuttle 16 is able to be translated backwards and forwards towards and away from the valve seat 14 within a channel 20 defined by a generally sleeve-shaped guide 22. The guide 22 has at its end proximate the valve seat 14 an inward generally ring-shaped projection 23 through which the head 17 of the shuttle 16 projects when the valve is in its closed position. The travel of the shuttle 16 away from the valve seat 14 is limited by a stop member 24 which has an outer cylindrical screw-threaded surface engaging a complementary screw thread on the inner surface of the guide 22. The end of the shuttle 16 remote from the insert 18 carries a carbon-loaded plastics ring 26 flush with the top surface (as shown) of the shuttle 16. The arrangement is that when the shuttle 16 abuts against the stop member 24 the contact is made by the ring 26.

The shuttle 16 is formed with a deep recess 28. One end of a compression spring is seated on a surface in the recess 28. The other end of the compression spring 30 bears against the stop member 24. The stop member 24 engages and is carried by one end of a valve spindle 32. The other end of the valve spindle 32 is engaged by a handwheel 34. The spindle 32 carries a gland nut 36 which has a screw-threaded outer surface engaging a complementary screw thread on the inner surface of the guide 22. The arrangement of the handwheel 34, spindle 32 and gland nut 36 is generally conventional and need not be described further herein.

Not only is the inner surface of the guide 22 formed with screw threads. Its outer surface is also so formed. The screw thread on the outer surface of the guide 22 engages a complementary screw-threaded surface formed in the body 2. Another feature of the guide 22 is that it has at its end adjacent the handwheel 34 a socket 38 in which a tool can be inserted so as to translate the guide 22 relative to the body 2. When it is not desired to deliver gas from the cylinder 6, the stop member 24 bears against the shuttle 16 and holds it against the valve seat 14. When it is desired to open the valve and deliver gas from the cylinder 6, the handwheel 34 is turned so as to move the stop member away from the valve seat. As a result, the pressure of the gas in the cylinder 6 lifts the shuttle 16 from the valve seat 14 and allows gas to flow from the vertical leg 10 to the horizontal leg 12 of the passageway 8 and hence out of the valve to a pipeline (not shown) which conducts the gas to a user.

The translation of the shuttle 16 away from the valve seat 14 takes place against the bias of the compression spring 30. When the cylinder is nearly empty, the pressure in it falls to below that required to overcome the bias of the compression spring 30. The shuttle 16 is then urged towards the valve seat 14 by the compression spring 30 and the insert 18 then makes a valve-closing engagement with the seat 14. Accordingly, a positive pressure can always be maintained in the cylinder so as to prevent the backflow into it of any impurities adventitiously entering the horizontal leg 12 of the passageway 8. The shuttle 16 thus acts both as a minimum pressure valve and as a shut-off valve. The minimum pressure is typically selected to in the order of 2 bar to 6 bar absolute.

When the gas pressure in the cylinder 6 has fallen to such a low value that it is no longer able to overcome the bias of the compression spring 30, the cylinder may be refilled. It is an advantage of the apparatus according to the invention that a refilling pipeline may simply be connected to the horizontal leg 12 of the passageway 8. In order to open the valve for a refilling operation a tool is inserted in the socket 38 and the guide 22 is translated in a direction away from the valve seat 14. As a result, the shuttle member 16 and the stop member 24 are carried away from the valve seat 14 with the guide 22. The valve is therefore opened because even though the gas pressure in the cylinder 6 is not able to overcome the bias of the compression spring 30, the inward projection 23 of the guide 22 now acts as a stop preventing the shuttle 16 from engaging the valve seat 14. Therefore gas can flow through the passageway 8 into the cylinder. When the pressure in the cylinder equals that in the external pipeline (not shown), a tool (not shown) can be reinserted in the socket 38 and the guide 22 returned to its original position in which the shuttle member 16 is held in a valve closing position against the valve seat 14. (Alternative means to the tool and socket are possible in order to effect translation of the guide.)

The cylinder valve is configured such that the cylinder 6 is not able to be filled if the guide 22 is not in its (re)filling position. The head 17 of the shuttle 16 has an orifice 42 placing a region of the channel 20 intermediate the shuttle 16 and the stop member 24 in communication with the horizontal leg 12 of the passageway 8 (and the external part in which the leg 12 terminates) via the recess 28. Suppose an attempt is made to refill the cylinder 6 before the pressure has fallen to the minimum pressure. Gas flows from a source of refilling gas into the leg 12 of the passageway 8. At least some of the gas passes through the orifice 42 and recess 28 into the region of channel 20 intermediate the shuttle 16 and the stop member 24. A pressure in the channel 20 is thus created which is equal to or greater than the pressure in the cylinder. As a result the shuttle 16 is urged into its valve closing position so the cylinder 6 cannot be refilled. Even if the bias of the compression spring 30 were to have no effect the valve would still close in view of the body 15 of the shuttle 16 having a greater diameter than its head 17.

The shuttle 16 carries elastomeric sealing rings 50 and 52 to prevent or limit unwanted flow of gas between the external surfaces of the shuttle 16 and the internal surfaces of the guide 22. Analogously, elastomeric sealing rings 54 and 56 are held in engagement between the guide 22 and the body 2. Vent passages 58 and 60 are formed in the guide 22 and the body member 2, respectively, so as to vent to the atmosphere any gas that does flow past the sealing rings 50 and 54.

The body 2, shuttle 16, guide 22 and stop 24 are typically all made of brass.

An advantage of the valve according to the invention is that no contact is made between the tool that is inserted in the socket 42 and the shuttle 16 or the valve seat 14. Thus, such a tool is unlikely to act as a source of contamination of the gas delivered from the cylinder.

In the event that, for example, the valve shown in the drawing is to deliver gas to a medical pipeline, the face of the body 2 in the vicinity of the mouth of the horizontal leg 12 of the passageway 8 may be provided with suitable pins or sockets so as to enable it to be indexed to a pipeline designated for the delivery of the gas held in the cylinder.

While this invention has been described with respect to particular embodiments thereof, it is apparent that numerous other forms and modifications of the invention will be obvious to those skilled in the art. The appending claims in this invention generally should be construed to cover all such obvious forms and modifications which are within the true spirit and scone of the present invention.

The invention claimed is:

1. A cylinder valve comprising:
   a single valve member in the form of a spring-loaded shuttle, the spring exerting a pressure on the shuttle in a valve-closing direction;
   a valve seat against which said valve member bears in its valve-closing position;
   a guide defining a channel in which said shuttle is able to travel;
   a stop member able to be translated in said channel into and out of a position in which said stop member hold said valve member in its valve-closing position; and
   a valve body which is engaged by said guide, said guide being able to be translated into a position in which said shuttle cannot be brought to bear against said valve seat.

2. The cylinder valve according to claim 1, in which said shuttle has a head extending in the direction of said valve seat from a body of greater diameter than said head, said head having an orifice affording gas communication between an external port of said valve and a region of said channel intermediate said shuttle and said stop member.

3. The cylinder valve according to claim 1, in which said spring is a compression spring, one end of which is seated in a recess in said shuttle, and the other end of which bears against said stop member.

4. The cylinder valve according to claim 3 wherein the orifice in said head of said shuttle communicates with the said intermediate region of said channel via the recess.

5. The cylinder according to claim 1, wherein said valve seat is integral with said valve body.

6. The cylinder valve according to claim 1, wherein said stop member has a screw thread engaging a complementary screw thread in said guide.

7. The cylinder valve according to claim 1, wherein said stop member is carried on or integral with a valve spindle.

8. The cylinder valve according to claim 7, wherein said valve spindle terminates in a handwheel.

9. The cylinder valve according to claim 1, wherein said guide has a screw-threaded outer surface engaging a complementary screw in said valve body.

10. The cylinder valve according to claim 1, in which said guide has a socket in which can be inserted a tool operable to effect a translation of the guide relative to said valve body.

11. The cylinder valve according to claim 1, in which said guide has an internal surface that acts as a stop preventing engagement of said shuttle and said valve seat when the guide is in the said position.

12. A gas cylinder fitted with a cylinder valve as claimed in claim 1.

13. The gas cylinder according to claim 12 containing a medical gas.

* * * * *